Patented Aug. 24, 1943

2,327,966

UNITED STATES PATENT OFFICE 2,327,966

KETO SULPHIDES AND PROCESS FOR MAKING SAME

Glen H. Morey, Terre Haute, Ind., assignor to Commercial Solvents Corporation, Terre Haute, Ind., a corporation of Maryland No Drawing. Application March 8, 1941, Serial No. 382,340

7 Claims. (Cl. 260—590)

My invention relates to new organic sulphides, and more particularly to a new class of keto sulphides, and to a process for preparing these compounds.

The sulphides of my present invention constitute keto sulphides characterized by sulphide linkages in which sulphur is attached to a carbon atom in alpha position to the carbonyl group of an aliphatic ketone residue. This class of compounds may be represented by the following general formula:

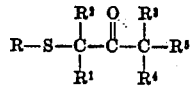

in which R represents a substituent of the class consisting of aliphatic, araliphatic, and aromatic radicals, $R^1$, $R^2$, $R^3$, $R^4$, and $R^5$ represent elements of the class consisting of hydrogen atoms, halogen atoms, carbon atoms of aliphatic groups, carbon atoms of araliphatic groups, carbon atoms of aromatic groups, and sulphur atoms of —S—R groups, in which at least one of $R^1$, $R^2$, $R^3$, $R^4$, and $R^5$ is heavier than a hydrogen atom, and in which less than three of $R^1$, $R^2$, $R^3$, $R^4$, and $R^5$ represent sulphur atoms of —S—R groups. As an example of one particular class of keto sulphides which is included by the above generic formula, there may be mentioned those keto sulphides which are represented by the following structural formula:

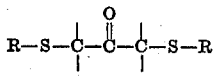

in which the R substituents are chosen from the class consisting of aliphatic groups, araliphatic groups, and aromatic groups, and wherein the free valences present therein may be satisfied by an element of the class consisting of hydrogen atoms, halogen atoms, carbon atoms of aliphatic groups, carbon atoms of araliphatic groups, carbon atoms of aromatic groups, and a sulphur atom of a —S—R group, in which at least one of said elements is heavier than a hydrogen atom.

A further class of keto sulphides which is likewise included by the above referred to generic formula, may be represented by the following structural formula:

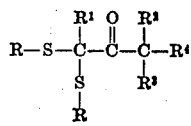

in which the R substituents are chosen from the class consisting of aliphatic groups, araliphatic groups, and aromatic groups, and $R^1$, $R^2$, $R^3$, and $R^4$ each represent an element of the class consisting of hydrogen atoms, halogen atoms, carbon atoms of aliphatic groups, carbon atoms of araliphatic groups, carbon atoms of aromatic groups, and a sulphur atom of a —S—R group.

It may be seen that the keto sulphides of the type mentioned above includes thioethers, thioacetals, thioketals and polymeric compounds containing these types of sulphide linkages. All such compounds may be prepared by the reaction of mercaptans with alpha-halogenated ketones. If equimolar quantities of a mercaptan and an alpha-halogenated ketone are reacted, a thioether will be formed, and if the alpha-halogenated ketone is an alpha-monohalogenated ketone, the thioether will be the only product. On the other hand, if alpha-poly-halogenated ketones are employed, and particularly if more than equimolar amount of mercaptan is reacted, sulphides containing two or more sulphide groups will be produced.

The halogenated ketones which may be employed in producing the keto sulphides of the present invention constitutes alpha-halogenated ketones of the general formula:

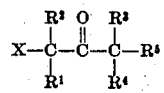

in which X is halogen, $R^1$, $R^2$, $R^3$, $R^4$, and $R^5$ are elements of the class consisting of hydrogen atoms, halogen atoms, carbon atoms of aliphatic groups, carbon atoms of araliphatic groups, and carbon atoms of aromatic groups, and at least one of $R^1$, $R^2$, $R^3$, $R^4$, and $R^5$ is heavier than a hydrogen atom. The alpha-halogenated ketones of this class may contain one or more atoms of any of the halogens, but I prefer to use chlorinated and brominated ketones, and especially the former. As examples of such compounds, there may be mentioned 1,1-dichloro-2-propanone, 1,3-dichloro-2-propanone, 1,1,3-trichloro-2-propanone, 3-chloro-2-butanone, 2,4-dichloro-3-pentanone, 2-chloro-3-hexanone, 2,4-dichloro-3-hexanone, 1-phenyl-3-chloro-2-propanone, 1-phenyl-3,3-dichloro-2-propanone, 4-phenyl-3-chloro-2-butanone, 4-phenyl-1,3-dichloro-2-butanone, and the like.

Any aliphatic, araliphatic, or aromatic mercaptan may be employed in producing the thioethers of the present invention. As examples of such mercaptans, there may be mentioned ethyl mercaptan, i-propyl mercaptan, n-butyl mercaptan, secondary-amyl mercaptan, allyl mercaptan, cyclohexyl mercaptan, thioglycol, thiophenol, benzyl mercaptan, and beta-phenylethyl mercaptan.

The reaction may be effected between the alpha-halogenated ketone and the free mercaptan, or between the alpha-halogenated ketone and a salt of the mercaptan, such as an alkali or alkaline earth metal salt. The latter type of reaction is preferable, since in this case a metal halide constitutes the concurrent reaction product, and substantially neutral conditions may be maintained throughout. If the free mercaptan is employed in the reaction, a halogen acid is the concurrent reaction product, and the resulting acidity tends to cause tar formation, with reduced yields of thioether. It is, of course, obvious that alkaline conditions should also be avoided, since such conditions favor condensation or polymerization reactions of alpha-halogenated ketones, which also tend to reduce the yield of thioether in the process.

Approximately equivalent weights of alpha-halogenated ketone and mercaptan are suitably employed in the reaction, i. e., one mole of mercaptan per atom of halogen in the alpha-halogenated ketone. However, an excess of either of the reactants may be employed, if desired.

In the preparation of ketonyl thioethers or other sulphides containing two or more ketone groups, it is unnecessary to attempt to use a ketonyl mercaptan in the reaction. If an alpha-halogenated ketone is reacted with a metal sulphide, or hydrosulphide, the ketonyl mercaptan may be formed as an intermediate, without the necessity for isolating it. The hydrosulphide is preferable to the sulphide for this reaction in view of the weaker alkalinity of the former, and I generally prefer to employ sodium hydrosulphide or potassium hydrosulphide. For this purpose, one mole of sodium hydrosulphide per atom of halogen in the alpha-halogenated ketone is suitably used, although an excess of either of the reactants can be employed. If an alpha-monohalogenated ketone is used in the reaction, a ketonyl thioether will be produced. On the other hand, if an alpha-polyhalogenated ketone is used, a polymeric keto sulphide may be formed. In this way it is possible to prepare compounds of high molecular weight having a polymeric structure of alternate sulphide and ketone units in open chain or cyclic formation, or both.

The reaction is desirably effected in an inert solvent which is a mutual solvent for both of the reactants, and preferably is a selective solvent for one of the reaction products. Many solvents are suitable for this purpose, but it is generally preferred to employ water, or an alcohol or a hydrocarbon solvent of relatively low boiling point, as, for example, ethyl alcohol, i-propyl alcohol, n-butyl alcohol, benzene, toluene, or xylene. The use of a relatively low boiling solvent is particularly desirable if the free mercaptan is employed in the reaction, since in this case the solvent mixture may be refluxed to sweep out the hydrogen halide gas as it is formed in the reaction. The same effect could be secured by bubbling an inert gas through the reaction mixture, since elevated temperatures are generally unnecessary for this reaction. When a mercaptide is employed in the process action, the reaction is desirably effected at ordinary room temperature, or at temperatures up to 40° C. When the reaction is apparently concluded, the mixture may suitably be heated to a higher temperature for a short time to ensure complete reaction.

At the conclusion of the reaction, unreacted reactants and the concurrently produced halide may be separated by any convenient method. Residual halogen acid, and unreacted reactants may easily be separated by distillation, and metal halides may be separated by filtration, if the reaction was effected in an organic solvent. Other suitable separation procedures will, of course, be apparent to those skilled in the art.

My invention may be further illustrated by the following specific examples:

Example I

A mixture of 371 parts by weight of methyl alpha-chloroethyl ketone and 450 parts by weight of benzene was refluxed, and to the refluxing mixture there was slowly added 270 parts by weight of n-butyl mercaptan. After evolution of hydrogen chloride ceased, the benzene was distilled off and the residue was fractionally distilled under reduced pressure. The product, 3-butylthio-2-butanone, distilled at 120.5° C. (50 mm.), and was obtained in a yield of 82.3% of the theoretical yield. This product boiled at 202° C. at atmospheric pressure, and had a density of 0.924 at 20°/20° C. The 2,4-dinitrophenylhydrazone was prepared and was found to have a melting point of 69° C. and a sulphur content of 8.75% (theoretical, 9.43%).

Example II

An aqueous solution of sodium hydroxide, comprising 200 parts by weight of sodium hydroxide in 1000 parts by weight of water, was maintained below 30° C. while adding 450 parts by weight of n-butyl mercaptan. The resulting solution of sodium butyl mercaptide was maintained below 40° C. while agitating and slowly adding 318 parts by weight of unsymmetrical dichloroacetone. The mixture was then heated for one-half hour at 100° C., cooled to room temperature, and allowed to separate. The oily layer was stripped of volatile components by distilling to 90° C. (30 mm.), leaving 1,1-dibutylthio-2-propanone as the distillation residue. This material was obtained in a yield of 83.6% of the theoretical yield.

Analysis: Calculated sulphur content of 1,1-dibutylthio-2-propanone, 27.35%; found, 27.11%.

Example III

Approximately 140 parts by weight of potassium hydroxide was dissolved in 800 parts by weight of 95% ethyl alcohol, and 234 parts by weight of n-butyl mercaptan was added to the solution. To the resulting solution of potassium butyl mercaptide there was slowly added a solution of 135 parts by weight of symmetrical dichloroacetone in 500 parts by weight of 95% ethyl alcohol. The resulting mixture was then heated for 5 hours at 100° C., after which it was cooled and the potassium chloride was separated by filtration. The filtrate was mixed with five times its volume of water, and allowed to separate. The oil layer was then distilled under reduced pressure, and the 1,3-dibutylthio-2-propanone was obtained as a water-white oily liquid boiling at 123° C. (5 mm.).

Analysis: Calculated sulphur content of 1,3-dibutylthio-2-propanone, 27.35%; found, 28.13%.

Example IV

Approximately 63 parts by weight of symmetrical dichloroacetone was added to 540 parts by weight of benzene, and the mixture was refluxed. There was then slowly introduced, through a distributor at the bottom of the boiling solution, 130 parts by weight of ethyl mercaptan. Refluxing was continued for a total of 48 hours, after which the benzene was distilled off. The residue was then distilled under reduced pressure and the 1,3-diethylthio-2-propanone was obtained as a straw-colored oil boiling at 130° C. (2–3 mm.). The product had a distinct sulphide odor, and was found to be entirely free from chlorine.

*Example V*

Approximately 110 parts by weight of thiophenol was introduced into a caustic solution comprising 40 parts by weight of sodium hydroxide and 200 parts by weight of water. The resulting solution of sodium phenyl mercaptide was cooled with ice, and 70 parts by weight of unsymmetrical dichloroacetone was added slowly while the mixture was stirred. Reaction was evidenced by heat evolution. At the conclusion of the reaction the mixture constituted two liquid phases. Benzene was added and the water was removed by distilling off the azeotropic benzene-water mixture. Residual benzene was then distilled off, and the remaining oil was cooled to effect crystallization. After recrystallizing three times from alcohol, the 1,1-diphenylthio-2-propanone, $(C_6H_5S)_2CHCOCH_3$ was found to melt at 42° C.

Ananlysis: Calculated sulphur content of 1,1-diphenyl-thio-2-propanone, 23.37%; found, 23.00%.

*Example VI*

A solution of 240 parts by weight of sodium hydroxide in 600 parts by weight of water was saturated with hydrogen sulphide. To the resulting solution of sodium hydrosulphide there was slowly added 380 parts by weight of symmetrical dichloroacetone, during which time the mixture was stirred and kept below 30° C. A mass of cream-colored rubber-like polymer was formed, which was freed from sodium chloride by kneading with water. This polymer probably comprises chain and ring structures made up of

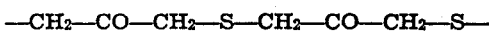

units. The material had a distinct sulphide odor, and possessed great extensibility but little elastic recovery.

It is to be understood, of course, that the above examples are merely illustrative, and that my invention is not limited to the particular keto sulphides described nor to the particular procedures employed. My invention includes the entire class of keto sulphides as previously defined, and as set forth in the appended claims. This class of sulphides comprises relatively non-volatile compounds ranging from lower molecular weight oily liquids, to crystalline solids and rubber-like polymers. Most of the compounds have a characteristic sulphide odor, although certain of the crystalline compounds have very slight odor, or no perceptible odor. This class of compounds is subject to identifying tests for carbonyl and sulphide groups, such as the formation of oximes, phenylhydrazones, sulphoxides, sulphones, and mercuric chloride addition products. All of the compounds of the present class contain reactive carbonyl groups, and are useful for the preparation of derivatives by known ketone reactions.

My invention now having been described, what I claim is:

1. A keto sulphide characterized by the structure:

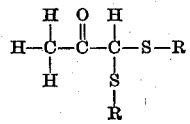

in which the R substituents are chosen from the class consisting of alkyl, aralkyl and aryl groups.

2. 1,1-dibutylthio-2-propanone.
3. 1,1-diphenylthio-2-propanone.
4. A keto sulfide having the general formula:

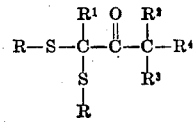

in which R represents a member of the class consisting of alkyl, aralkyl and aryl, $R^1$, $R^2$, $R^3$ and $R^4$ represent members of the class consisting of hydrogen, halogen, alkyl, aryl and S—R groups, and in which less than two of $R^1$, $R^2$, $R^3$ and $R^4$ represent S—R groups.

5. In a process for the production of keto sulphides containing two sulphide groups attached to the alpha carbon atom, the steps which comprise reacting, in a neutral medium, one mole of unsymmetrical alpha-dihalogenated ketone with two moles of a mercaptan in the presence of an inert mutual solvent, such mercaptan having the general formula: R—S—H, in which R is chosen from the class consisting of alkyl, aralkyl, and aryl, to produce the aforesaid keto sulphide and the corresponding hydrogen halide, and maintaining said medium in a substantially neutral state by continuously removing said hydrogen halide therefrom in the form of a gas, as it is produced therein.

6. In a process for the production of keto sulphides containing two sulphide groups attached to the alpha carbon atom, the steps which comprise reacting, in a neutral medium, one mole of an unsymmetrical alpha-dihalogenated ketone with two moles of a mercaptan in the presence of an inert mutual solvent, such mercaptan having the general formula: R—S—H, in which R is chosen from the class consisting of alkyl, aralkyl, and aryl, to produce the aforesaid keto sulphide and the corresponding hydrogen halide, and maintaining said medium in a substantially neutral state by effecting the reaction at the approximate reflux temperature of the mixture, thereby continuously sweeping out said hydrogen halide in the form of a gas as it is produced therein.

7. In a process for the production of keto sulphides containing two sulphide groups attached to the alpha carbon atom, the steps which comprise reacting, in a neutral medium, one mole of an unsymmetrical alpha-dichlorinated ketone with two moles of a mercaptan in the presence of an inert mutual solvent, said mercaptan having the general formula: R—S—H, in which R is chosen from the class consisting of alkyl, aralkyl, and aryl, to produce the aforesaid keto sulphide and hydrogen chloride, and maintaining said medium in a substantially neutral state by continuously removing said hydrogen chloride therefrom in the form of a gas, as it is produced therein.

GLEN H. MOREY.